(12) United States Patent
Yamanashi

(10) Patent No.: US 7,751,772 B2
(45) Date of Patent: Jul. 6, 2010

(54) BROADCAST RECEIVER AND METHOD OF CONTROL THEREOF

(75) Inventor: Naoki Yamanashi, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1002 days.

(21) Appl. No.: 11/499,774

(22) Filed: Aug. 7, 2006

(65) Prior Publication Data

US 2007/0050819 A1    Mar. 1, 2007

(30) Foreign Application Priority Data

Aug. 31, 2005    (JP)    ............................. 2005-252455

(51) Int. Cl.
 *H04H 20/71* (2008.01)
(52) U.S. Cl. .................... 455/3.01; 455/3.06
(58) Field of Classification Search .................. 455/3.1, 455/3.2; 725/58
See application file for complete search history.

(56) References Cited

U.S. PATENT DOCUMENTS

| | | | |
|---|---|---|---|
| 5,930,493 A * | 7/1999 | Ottesen et al. | 725/92 |
| 2002/0025777 A1 * | 2/2002 | Kawamata et al. | 455/3.05 |
| 2002/0089610 A1 * | 7/2002 | Ohno et al. | 348/734 |
| 2003/0066078 A1 * | 4/2003 | Bjorgan et al. | 725/34 |

FOREIGN PATENT DOCUMENTS

| | | |
|---|---|---|
| JP | 9-298734 | 11/1997 |
| JP | 11-191884 | 7/1999 |
| JP | 2001-76473 | 3/2001 |
| JP | 2001-189911 | 7/2001 |
| JP | 2001-291318 | 10/2001 |
| JP | 2002-271740 | 9/2002 |
| JP | 3490670 | 11/2003 |
| JP | 2004-187175 | 7/2004 |
| JP | 2004-260767 | 9/2004 |
| JP | 2006-94438 | 4/2006 |

OTHER PUBLICATIONS

Office Action mailed Jun. 10, 2008, for corresponding Japanese Application No. 2005-252455, and English Translation thereof. (6 pages).

* cited by examiner

*Primary Examiner*—Philip J Sobutka
(74) *Attorney, Agent, or Firm*—Finnegan, Henderson, Farabow, Garrett & Dunner, L.L.P.

(57) ABSTRACT

According to one embodiment, when a recording process of transferring, via an output buffer, received broadcast contents over a network and recording them on external recording equipment and an acquisition process of acquiring, via an input buffer, AV contents obtained from external equipment over the network are carried out concurrently, the amount of data to be acquired by the acquisition process is limited when the amount of data stored in the output buffer has reached a preset value.

10 Claims, 3 Drawing Sheets

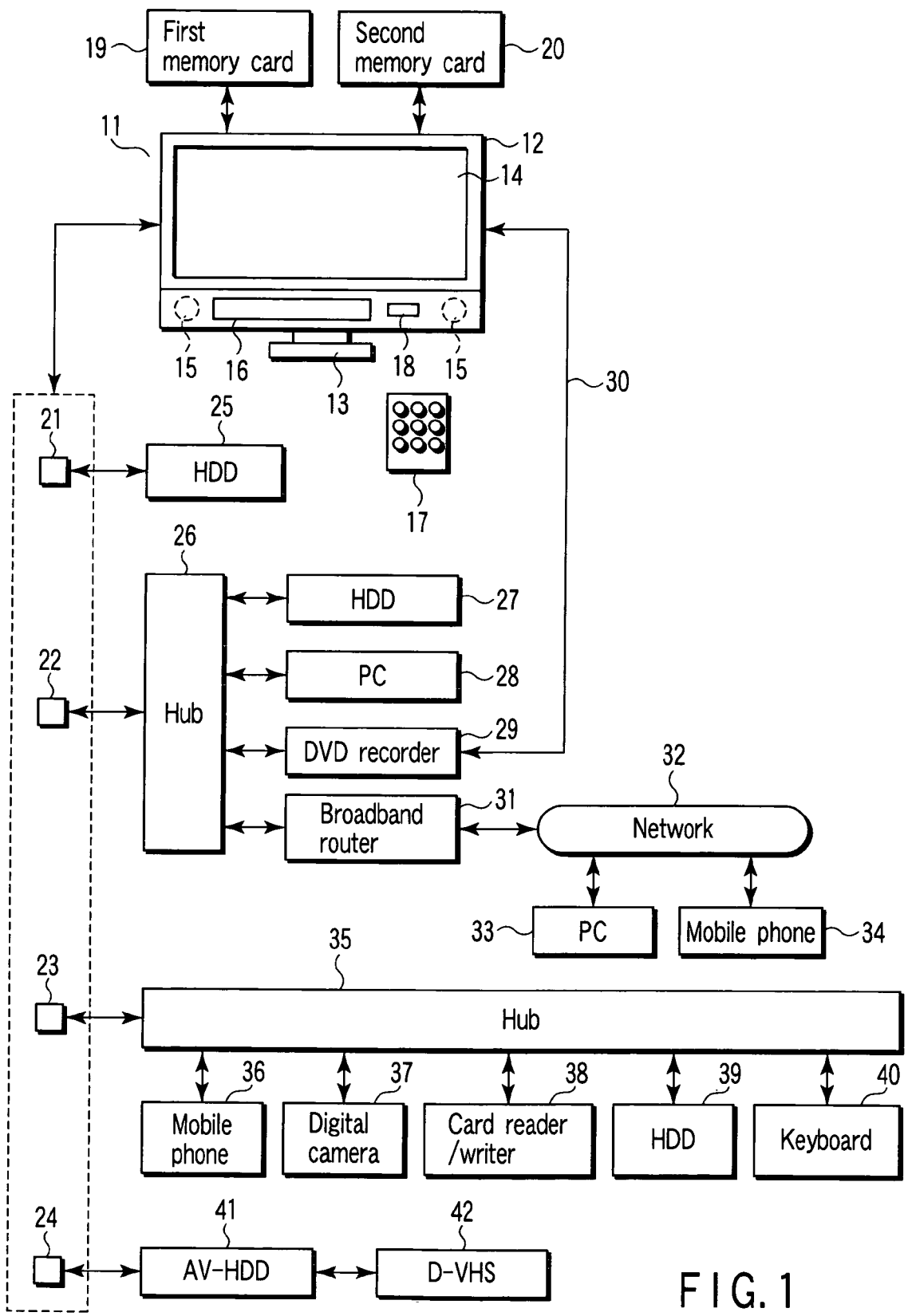
F I G. 1

BROADCAST RECEIVER AND METHOD OF CONTROL THEREOF

CROSS-REFERENCE TO RELATED APPLICATIONS

This application is based upon and claims the benefit of priority from Japanese Patent Application No. 2005-252455, filed Aug. 31, 2005, the entire contents of which are incorporated herein by reference.

BACKGROUND

1. Field

One embodiment of the invention relates to a broadcast receiver and a control method therefor which allows received broadcast contents to be recorded on a digital recorder and player over an in-home network by way of example.

2. Description of the Related Art

As is well known, such a broadcast receiver as described above is adapted to temporarily store received broadcast contents in an output buffer. The broadcast contents stored in the output buffer are read every predetermined (preset) amount of data, then transferred to a digital recorder and player, such as a hard disk drive (HDD), over the in-home network and recorded on it.

With this type of broadcast receiver, when the speed of transferring data to the digital recorder and player becomes lowered due to the network load conditions in the process of recording received broadcast contents on the recorder and player, the output buffer may overflow. In that event, the recording process will end in failure.

Japanese Unexamined Patent Publication No. 11-191884 discloses a configuration such that, in a network system composed of a video server of stream type and a terminal computer of file input/output type, when the remaining capacity of the output buffer has reduced less than a predetermined value, the terminal computer issues to the server a stream type of request to temporarily stop sending.

However, the above Patent Publication is irrelevant to the problem that, when broadcast contents received by a broadcast receiver are transferred over an in-home network to a digital recorder and player for recording, the output buffer may overflow due to the load conditions of the network to cause the recording process to end in failure.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 schematically shows a digital television broadcast receiver and a network system configured with the broadcast receiver as its center according to an embodiment of the present invention;

DETAILED DESCRIPTION

Figure 2:
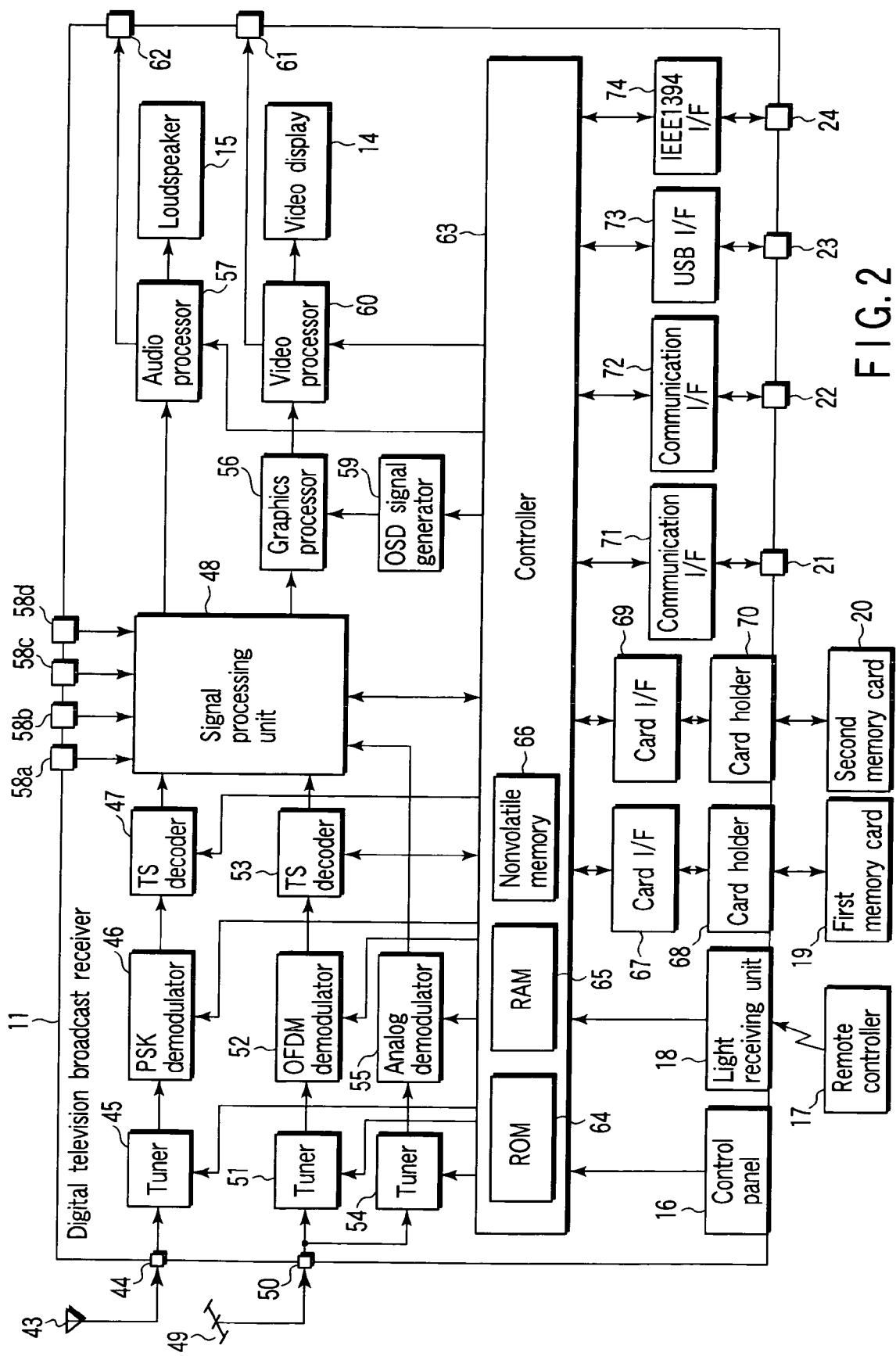
FIG. 2 is a block diagram of the main signal processing system of the digital television broadcast receiver shown in FIG. 1.

Various embodiments according to the invention will be described hereinafter with reference to the accompanying drawings. In general, according to one embodiment of the invention, when a recording process of transferring, via an output buffer, received broadcast contents over a network and recording them on external recording equipment and an acquisition process of acquiring, via an input buffer, AV contents obtained from external equipment over the network are carried out concurrently, the amount of data to be acquired by the acquisition process is limited when the amount of data stored in the output buffer has reached a preset value.

FIG. 1 schematically shows the appearance of a digital television broadcast receiver 11 to be described in this embodiment and an example of a network system configured with the broadcast receiver as its center.

The digital television broadcast receiver 11 is composed chiefly of a flat type of cabinet 12 and a support 13 of the cabinet. The cabinet 12 contains a flat-panel video display unit 14, such as an SED (surface conduction electron emitter display), an LCD (liquid crystal display), etc., a loudspeaker 15, an operator control panel 16, and a light receiving unit 18 adapted to receive radio control signals transmitted from a remote controller 17.

The digital television broadcast receiver 11 is constructed so that a first memory card 19, such as an SD (secure digital) memory card, a multimedia card (MMC), a memory stick, etc., can be removably inserted into its first slot. Information, such as programs, photographs, etc., can be recorded on or reproduced from the first memory card 19.

Furthermore, a second memory card 20, such as a smart card, can also be removably inserted into a second slot of the broadcast receiver 11. The second memory card 20 has been recorded with, for example, contract information. Information can be recorded on or reproduced from the second memory card 20.

The digital television broadcast receiver 11 is further equipped with a first LAN (local area network) terminal 21, a second LAN terminal 22, a USB (universal serial bus) terminal 23, and an IEEE-1394 terminal 24.

Of these terminals, the first LAN terminal 21 is used as the LAN compliant HDD-dedicated port. That is, the first LAN terminal 21 is used to write on or read from a LAN compliant HDD 25 (NAS (network attached storage)) connected to it, through the Ethernet (registered trade mark).

Thus, equipping the digital television broadcast receiver 11 with the first LAN terminal 21 as the LAN compliant HDD-dedicated port allows broadcast programs of high-definition television picture quality to be recorded on the HDD 25 with stability without being affected by other network environments or network usage.

The second LAN terminal 22 is used as the usual Ethernet-based LAN compliant port. That is, the second LAN terminal 22 is connected through a hub 26 with pieces of equipment, such as a LAN compliant HDD 27, a personal computer (PC) 28, a digital versatile disk (DVD) recorder 29 with a built-in HDD, etc., which are interconnected to build an in-home network, for information communication with these equipment.

In this case, the PC 28 and the DVD recorder 29 each have functions to operate as a contents server in the in-home network and are configured as UPnP (universal plug and play) compliant equipment that has services to provide URI information necessary for contents access.

The DVD recorder 29 and the digital television broadcast receiver 11 are connected together by a dedicated analog transmission line 30 in order to transmit analog video and audio information therebetween because digital information communicated via the second LAN terminal 22 is that for control only.

In addition, the second LAN terminal 22 is connected through a broadband router 31 connected to the hub 26 to an external network 32 (for example, the Internet). The second LAN terminal 22 is also used to communicate with a PCC 33 or a mobile phone 34 over the network 32.

The USB terminal 23, used as the usual USB compliant port, is connected through a hub 35 with pieces of USB equipment, such as a mobile phone 36, a digital camera 37, a card reader/writer 38, an HDD 39, a keyboard 40, etc., for communication with these equipment.

The IEEE-1394 terminal 24 is connected with an AV (audio video)-HDD 41 and a D (digital)-VHS (video home system) 42, which are connected in series, for information communication with these equipment.

FIG. 2 shows the main signal processing system of the digital television broadcast receiver 11. BS (broadcast satellite)/CS (communication satellite) digital television broadcast signals are received by a satellite digital broadcast receiving antenna 43 and then applied through an input terminal 44 to a satellite digital broadcast tuner 45. Thereby, a broadcast signal on a desired channel is selected.

The broadcast signal selected by the tuner 45 is sequentially applied to a PSK (phase shift keying) demodulator 45 and a TS (transport stream) decoder 47 whereby digital video and audio signals are recovered. The resulting digital video and audio signals are then output to a signal processing unit 48.

Terrestrial digital television broadcast signals are received by a terrestrial broadcast receiving antenna 49 and then applied through an input terminal 50 to a terrestrial digital broadcast tuner 51. Thereby, a broadcast signal on a desired channel is selected.

The broadcast signal selected by the tuner 51 is sequentially applied to an OFDM (orthogonal frequency division multiplexing) demodulator 52 (in the case of Japan) and a TS decoder 53, whereby digital video and audio signals are recovered. The resulting digital video and audio signals are then output to the signal processing unit 48.

Terrestrial analog television broadcast signals are received by the terrestrial broadcast receiving antenna 49 and then applied through the input terminal 50 to a terrestrial analog broadcast tuner 54. Thereby, a broadcast signal on a desired channel is selected. The broadcast signal selected by the tuner 54 is applied to an analog demodulator 55 whereby analog video and audio signals are recovered. The resulting analog video and audio signals are then output to the signal processing unit 48.

The signal processing unit 48 performs predetermined digital signal processing on the digital video and audio signals output from each of the TS decoders 47 and 53 and then outputs the resulting digital video and audio signals to a graphics processor 56 and an audio processor 57, respectively.

To the signal processing unit 48 are connected to two or more input terminals (four input terminals 58a, 58b, 58c and 58d are shown in the diagram), which allow analog video and audio signals to be externally input to the broadcast receiver 11.

The signal processing unit 48 converts analog video and audio signals input from the analog demodulator 55 or the input terminals 58a to 58d into digital form, then performs predetermined digital signal processing on the digitized video and audio signals and outputs the resulting digital video and analog signals to the graphics processor 56 and the audio processor 57, respectively.

The graphics processor 56 has a function of superimposing OSD signals produced by an OSD (on screen display) signal generator 59 on a digital video signal from the signal processing unit 56. The graphics processor 56 can selectively output an output video signal from the signal processing unit 48 or an output OSD signal from the OSD signal generator 59 or can output both the output signals in combination so that each of them makes up a respective half of the screen.

The digital video signal output from the graphics processor 56 is applied to a video processor 60, which converts the input digital video signal into an analog video signal the video display unit 14 can display and then delivers the analog video signal to the video display unit and an output terminal 61 adapted to output the video signal to outside.

The audio processor 57 converts the input digital audio signal into an analog audio signal the loudspeaker 15 can reproduce and then delivers the analog audio signal to the loudspeaker and an output terminal 62 adapted to output the audio signal to outside.

The digital television broadcast receiver 11 has its all operations including the above-stated receiving operations controlled by a controller 63, which has a CPU (central processing unit) built in. Upon receipt of operating information from the operating unit 16 or the remote controller 17 through the light receiving unit 18, the controller 63 controls each component so that the contents of the operation are reflected.

In this case, the CPU 63 chiefly employs a ROM (read only memory) 64 stored with control programs executed by the CPU, a RAM (random access memory) 65 serving as the working area of the CPU, and a nonvolatile memory 66 stored with various pieces of setting and control information.

The controller 63 is connected via a card interface (I/F) 67 to a card holder 68 into which the aforementioned first memory card 19 can be loaded. Thereby, the controller 63 is allowed to communicate via the card I/F 63 with the first memory card 19 loaded into the card holder 68.

The controller 63 is also connected via a card interface (I/F) 69 to a card holder 70 into which the aforementioned second memory card 20 can be loaded. Thereby, the controller 63 is allowed to communicate via the card I/F 69 with the second memory card 20 loaded into the card holder 70.

The controller 63 is connected via a communication I/F 71 to the first LAN terminal 21. Thereby, the controller 63 is allowed to communicate via the communication I/F 71 with the LAN compliant HDD 25 connected to the first LAN terminal 21. In this case, the controller 63 has the DHCP (dynamic host configuration protocol) server facility and assigns an IP (internet protocol) address to the LAN compliant HDD 25 connected to the first LAN terminal 21 to control it.

The controller 63 is also connected via a communication I/F 72 to the second LAN terminal 22. Thereby, the controller 63 is allowed to communicate via the communication I/F 72 with each equipment (see FIG. 1) connected to the second LAN terminal 22.

The controller 63 is also connected via a USB I/F 73 to the USB terminal 23. Thereby, the controller 63 is allowed to communicate via the USB I/F 73 with each equipment (see FIG. 1) connected to the USB terminal 23.

The controller 63 is also connected via an IEEE-1394 I/F 74 to the IEEE-1394 terminal 24. Thereby, the controller 63 is allowed to communicate via the IEEE-1394 I/F 74 with each equipment (see FIG. 1) connected to the IEEE-1394 terminal 24.

Figure 3A:
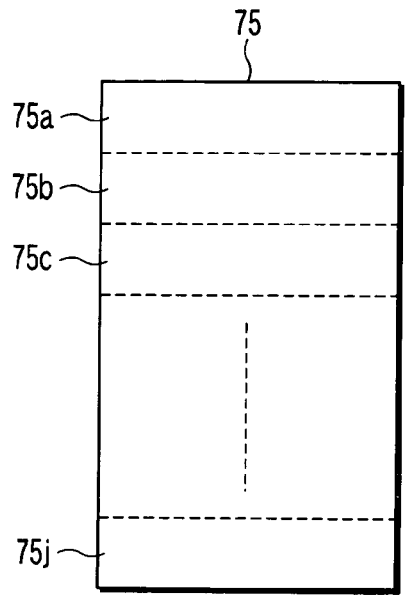
FIGS. 3A and 3B are diagrams for use in explanation of an output buffer and an input buffer in the digital television broadcast receiver shown in FIG. 1.

In recording the received and demodulated broadcast contents on the HDD 27 connected to the second LAN terminal 22, the controller 63 temporarily stores data to be sent to the HDD 27 in an output buffer 75 set up in the RAM 65 as shown in FIG. 3A.

In view of the transmission capacity of the in-home network and the recordable data unit of the HDD 27 which is a digital recorder and player, the output buffer 75 is divided into ten blocks 75a, 75b, 75c, . . . , and 75j each capable of storing a preset amount of data.

The controller 63 sequentially writes data into each block of the output buffer 75 from block 75a to block 75j and, upon completion of writing into the block 75j, writes data into the block 75a again (the old data in the block 75a is overwritten). That is, data is sequentially written into each of the blocks 75a to 75j on a cyclic basis.

When the block 75a has become full, the controller 63 reads data stored in that block and then records it on the HDD 27. Next, when the block 75b has become full, the controller 63 reads data stored in that block and then records it on the HDD 27. That is, data is read from each of the blocks 75a to 75j in a cyclic manner.

When broadcast contents are normally being recorded on the HDD 27, the balance is held between the speed of writing into the output buffer 75 and the speed of reading from the output buffer. Therefore, only two blocks are used at a time; a block which is being written into and a block which is being read from. In the other eight blocks, only data which has already been read is left.

When the speed of transferring data to the HDD 27 becomes reduced due to load conditions of the in-home network, for example, the speed of reading from the output buffer 75 becomes lower than the writing speed. Therefore, the number of blocks which are stored with data not yet read will increase gradually.

The output buffer 75 overflows when all the blocks 75a to 75j have become full of data not yet read. In that event, the recording of the broadcast contents on the HDD 27 ends in failure.

On the other hand, the controller 63 can make access to the PC 28, serving as a contents server, connected to the second LAN terminal 22 to obtain AV contents therefrom for video display and audio playback. In this case, the controller 63 temporarily stores the data obtained from the PC 28 in an input buffer 76 set up in the RAM 65 as shown in FIG. 3B.

Figure 3B:
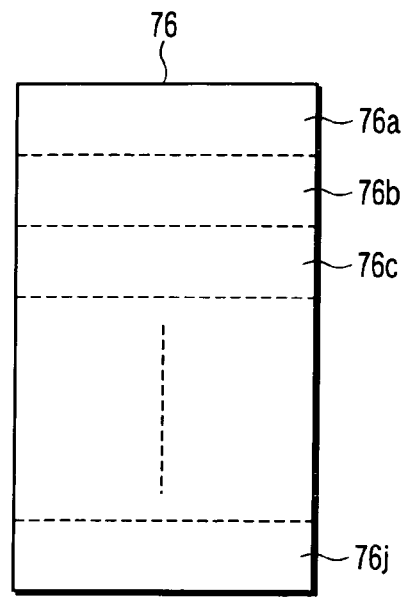

In view of the transmission capacity of the in-home network and the output data unit of the PC 28, the input buffer 76 is divided, as shown in FIG. 3B, into ten blocks 76a, 76b, 76c, . . . , and 76j each capable of storing a preset amount of data.

The controller 63 sequentially writes data into each block of the output buffer 76 from block 76a to block 76j and, upon completion of writing into the block 76j, writes data into the block 76a again (the old data in the block 76a is overwritten). That is, data is sequentially written into each of the blocks 76a to 76j on a cyclic basis.

When the block 76a has become full, the controller 63 reads data stored in that block to display video and play back audio. Next, when the block 76b has become full, the controller 63 reads data stored in that block to display video and reproduce audio. Thus, data is read from each of the blocks 76a to 76j in a cyclic manner.

Here, consider the concurrent execution of the process of recording received broadcast contents on the HDD 27 and the process of acquiring AV contents from the PC 28. In this case, the controller 63 monitors the number of blocks in the output buffer 75 which are stored with data not yet read and, when the number of blocks reaches eight, stops acquiring AV contents from the PC 28.

Thereby, the network load is reduced by a portion for transferring AV contents from the PC 28 to the digital television broadcast receiver 11, making it possible to prevent the output buffer 75 from overflowing as much as possible. For this reason, the process of recording broadcast contents on the HDD 27 connected to the network can be implemented with high reliability.

Figure 4:
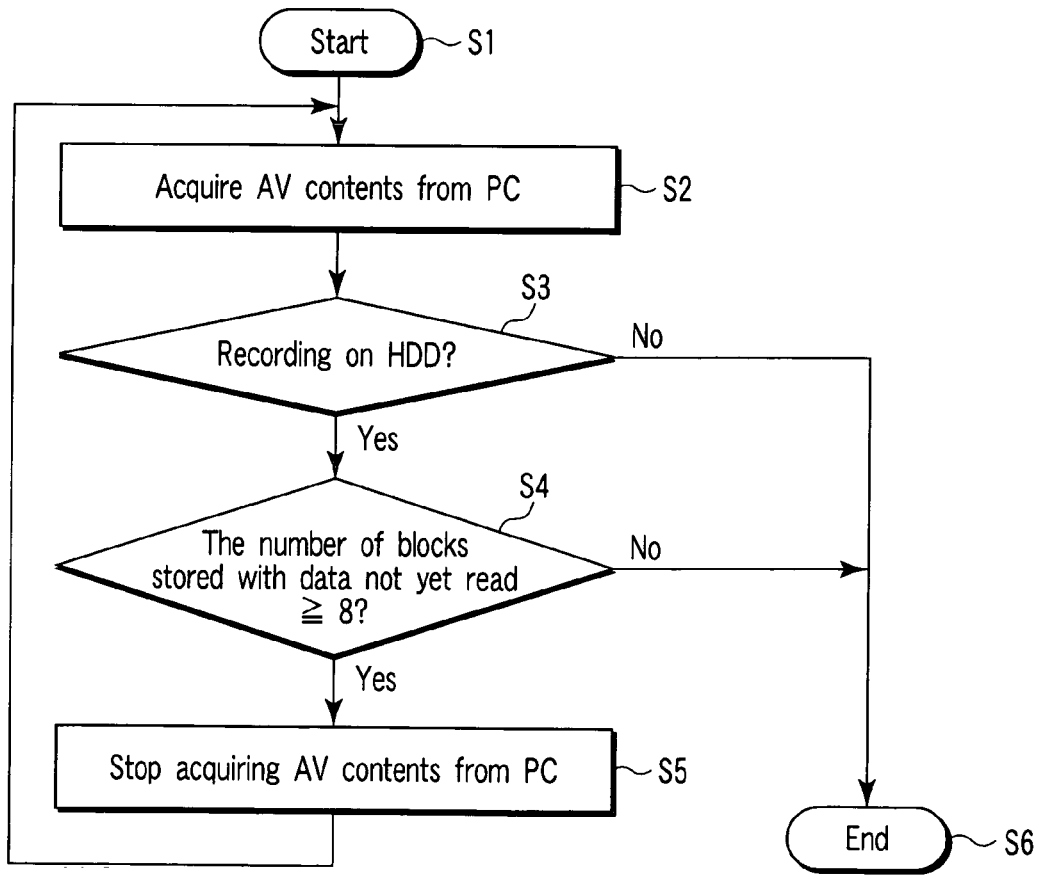
FIG. 4 is a flowchart illustrating the main procedure of the digital television broadcast receiver shown in FIG. 1.

FIG. 4 is a flowchart illustrating a procedure carried out by the controller 63. After the start of the procedure (block S1), when the process of acquiring AV contents from the PC 28 is carried out in block S2, the controller 63 makes, in block S3, a decision of whether or not the process of recording received broadcast contents on the HDD 27 is being carried out.

If the decision is NO, then the controller 63 brings the procedure to an end as it is (block S6).

If, on the other hand, the decision is that the recording process is being carried out (YES in block S3), then the controller 63 makes a decision of whether or not the number of blocks in the output buffer 75 which are stored with data not yet read has reached eight (block S4).

If the decision is that the number of blocks which are stored with data not yet read is less than eight (NO in block S4), then the controller 63 brings the procedure to an end as it is (block S6).

If, on the other hand, the decision is that the number of blocks which are stored with data not yet read is eight or more (YES in block S4), then the controller 63 stops acquiring AV contents from the PC 28 in block S5 and returns to block S2.

According to the above-stated embodiment, when the process of recording broadcast contents on the HDD 27 and the process of obtaining AV contents from the PC 28 are carried out concurrently, the latter process is stopped when the number of blocks in the output buffer 75 which are stored with data not yet read has reached eight.

As described above, therefore, the network load is reduced by a portion for transmitting AV contents from the PC 28, allowing overflowing of the output buffer 75 to be prevented as much as possible and the process of recording broadcast contents on the HDD 27 connected to the network to be implemented with high reliability.

The above-stated embodiment is configured to stop obtaining AV contents from the PC 28 when the number of blocks in the output buffer 75 which are stored with data not yet read has reached eight; however, this is not restrictive. For example, the data amount of AV contents obtained from the PC 28 may be set lower than normal.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A broadcast receiver comprising:
    a recording section configured to transfer received broadcast contents via an output buffer over a network and record them on an external recorder;
    an acquisition section configured to acquire contents obtained over the network from external equipment;

a detecting section configured to detect that an amount of data stored in the output buffer has reached a predetermined value in a state in which the recording by the recording section and the acquiring by the acquisition section are being performed concurrently; and a control section configured to restrict the amount of data to be acquired by the acquisition section and thereby reduce a load on the network when the detection section detects that the amount of data stored in the output buffer has exceeded the predetermined value.

2. The broadcast receiver according to claim 1, wherein the control section is configured to stop the acquiring by the acquisition section on the result of detection by the detecting section that the amount of data stored in the output buffer has reached the predetermined value.

3. The broadcast receiver according to claim 1, wherein the output buffer is divided into a plurality of blocks each of which is adapted to store a predetermined amount of data, and the detecting section is configured to detect that the number of blocks in the output buffer which are stored with data not yet read has reached the predetermined value.

4. The broadcast receiver according to claim 1, wherein the recording section includes a receiving section configured to receive a broadcast signal, a demodulating section configured to demodulate the broadcast signal received by the receiving section, a storage section configured to store data demodulated by the demodulating section into the output buffer, and a transferring section configured to read the data stored in the output buffer and transfer it to recording equipment on the network.

5. The broadcast receiver according to claim 1, wherein the recording section is configured to receive a television broadcast and the acquisition section is configured to acquire AV contents.

6. A broadcast receiver control method comprising:

a first step of acquiring contents obtained from external equipment over a network;

a second step of detecting that an execution of transferring received broadcast contents via an output buffer over the network and an execution of recording the received broadcast contents on external recording equipment occur when the first step of acquiring is being carried out;

a third step of detecting that an amount of data stored in the output buffer has reached a predetermined value on the basis of the second step of detecting and a fourth step of limiting an amount of data acquired during the first step of acquiring and thereby reducing a load on the network when the third steps of detecting detects that the amount of data stored in the output buffer has exceeded the predetermined value.

7. The broadcast receiver control method according to claim 6, wherein the fourth step of limiting further comprises:

stopping the first step of acquiring when the result of detection of the third step of detecting indicates that the amount of data stored in the output buffer has reached the predetermined value.

8. The broadcast receiver control method according to claim 6, wherein the output buffer is divided into a plurality of blocks each adapted to store a preset amount of data, and wherein the third step of detecting further comprises:

detecting that the number of blocks in the output buffer which are not yet read from has reached the predetermined value.

9. The broadcast receiver control method according to claim 6, wherein transferring the received broadcasted contents further comprises:

receiving a broadcast signal, demodulating the received broadcast signal as demodulated data storing the demodulated data into the output buffer, and reading the data stored in the output buffer and transferring it to recording equipment on the network.

10. The broadcast receiver control method according to claim 6, wherein transferring the received broadcasted contents further comprises receiving a television broadcast, and wherein the first step of acquiring further comprises acquiring AV contents.

* * * * *

UNITED STATES PATENT AND TRADEMARK OFFICE
CERTIFICATE OF CORRECTION

PATENT NO. : 7,751,772 B2
APPLICATION NO. : 11/499774
DATED : July 6, 2010
INVENTOR(S) : Yamanashi It is certified that error appears in the above-identified patent and that said Letters Patent is hereby corrected as shown below:

Claim 9, column 8, line 30, change "data" to --data,--.

Signed and Sealed this

Twenty-eighth Day of September, 2010

David J. Kappos
*Director of the United States Patent and Trademark Office*